(12) United States Patent
Olaleye (10) Patent No.: US 10,551,114 B2
(45) Date of Patent: *Feb. 4, 2020

(54) TRANSPORT REFRIGERATION SYSTEM CONTROLLER TO ENGINE CONTROL UNIT INTERFACE

(71) Applicant: THERMO KING CORPORATION, Minneapolis, MN (US)

(72) Inventor: Omosola Waidi Olaleye, Brooklyn Park, MN (US)

(73) Assignee: Thermo King Corporation, Minneapolis, MN (US)

( * ) Notice: Subject to any disclaimer, the term of this patent is extended or adjusted under 35 U.S.C. 154(b) by 180 days.

This patent is subject to a terminal disclaimer.

(21) Appl. No.: 15/233,342

(22) Filed: Aug. 10, 2016

(65) Prior Publication Data

US 2016/0348961 A1 Dec. 1, 2016

Related U.S. Application Data

(63) Continuation of application No. 13/873,800, filed on Apr. 30, 2013.

(Continued)

(51) Int. Cl.
*G05D 3/12* (2006.01)
*F25D 29/00* (2006.01)
(Continued)

(52) U.S. Cl.
CPC ....... *F25D 29/003* (2013.01); *B60H 1/00014* (2013.01); *B60H 1/3204* (2013.01);
(Continued)

(58) Field of Classification Search
CPC ... F25D 29/003; F25D 11/003; B60H 1/3232; B60H 1/00428; B60P 3/20; F25B 27/00
See application file for complete search history.

(56) References Cited

U.S. PATENT DOCUMENTS 4,633,473 A * 12/1986 Ratchford ........... G06F 11/2007
375/257
5,016,244 A * 5/1991 Massey, Jr. ......... G06F 11/2005
370/217
(Continued)

FOREIGN PATENT DOCUMENTS

EP 2822791 1/2015
EP 2823161 1/2015
(Continued)

OTHER PUBLICATIONS

Extended European Search Report, dated Jul. 29, 2016, European Patent Application 13784424.7 ( 7 pages).
(Continued)

*Primary Examiner* — Darrin D Dunn
(74) *Attorney, Agent, or Firm* — Hamre, Schumann, Mueller & Larson, P.C.

(57) ABSTRACT

Embodiments of a TRS Controller to ECU interface are provided. The interface includes a TRS Controller connected to an ECU that is part of an engine. The interface includes a keyswitch connection that is configured to send a keyswitch message from the TRS Controller to the ECU, a run signal connection that is configured to send a run message from the TRS Controller to the ECU, and a CAN communication connection that is configured to provide two-way communication between the TRS Controller and the ECU.

17 Claims, 6 Drawing Sheets

Related U.S. Application Data (60) Provisional application No. 61/640,606, filed on Apr. 30, 2012.

(51) Int. Cl.
*G05B 19/418* (2006.01)
*F25B 27/00* (2006.01)
*G05B 13/02* (2006.01)
*B60H 1/00* (2006.01)
*B60H 1/32* (2006.01)
*F25D 11/00* (2006.01)
*H04L 29/08* (2006.01)

(52) U.S. Cl.
CPC ............ *F25B 27/00* (2013.01); *F25D 11/003* (2013.01); *G05B 13/021* (2013.01); *G05B 19/4189* (2013.01); *H04L 67/12* (2013.01); *B60H 2001/3266* (2013.01); *B60H 2001/3269* (2013.01); *F25B 2600/00* (2013.01)

(56) References Cited

U.S. PATENT DOCUMENTS

| | | | |
|---|---|---|---|
| 5,117,643 A | 6/1992 | Sakurai et al. | |
| 5,140,826 A | 8/1992 | Hanson et al. | |
| 5,161,383 A | 11/1992 | Hanson et al. | |
| 5,186,015 A * | 2/1993 | Roehrich | B60H 1/3208 123/179.4 |
| 5,197,670 A * | 3/1993 | Hanson | B60H 1/00014 165/257 |
| 5,557,938 A * | 9/1996 | Hanson | B60H 1/3208 62/126 |
| 5,977,646 A | 11/1999 | Lenz et al. | |
| 6,047,222 A * | 4/2000 | Burns | G05B 19/4184 700/2 |
| 6,307,281 B1 | 10/2001 | Houston | |
| 6,321,550 B1 * | 11/2001 | Chopko | F25B 27/00 62/196.2 |
| 6,360,152 B1 | 3/2002 | Ishibashi et al. | |
| 6,404,326 B1 * | 6/2002 | Timmerman | G05B 19/0421 307/10.1 |
| 7,020,076 B1 * | 3/2006 | Alkalai | H04L 1/22 370/217 |
| 7,076,961 B2 | 7/2006 | Takusagawa et al. | |
| 7,210,049 B2 | 4/2007 | Disser | |
| 7,286,918 B2 | 10/2007 | Koenig et al. | |
| 7,289,446 B2 * | 10/2007 | Itoi | H04L 12/40163 370/235 |
| 7,580,820 B2 | 8/2009 | Sawada | |
| 7,739,013 B2 | 6/2010 | Ishio et al. | |
| 7,874,169 B2 * | 1/2011 | Leroy | B60H 1/00428 307/66 |
| 7,878,013 B2 | 2/2011 | Matsuno et al. | |
| 8,151,581 B2 | 4/2012 | Chen et al. | |
| 8,155,825 B2 | 4/2012 | Natsume | |
| 8,185,251 B2 | 5/2012 | Burnham et al. | |
| 8,276,396 B2 * | 10/2012 | Siegenthaler | H02K 9/19 62/239 |
| 8,494,745 B2 | 7/2013 | Schneider et al. | |
| 8,692,398 B2 * | 4/2014 | Neddermeyer, III | H02J 7/1415 290/5 |
| 9,134,058 B2 | 9/2015 | Ikemiya et al. | |
| 2002/0083255 A1 | 6/2002 | Greeff et al. | |
| 2004/0070364 A1 | 4/2004 | Cheong et al. | |
| 2004/0172954 A1 * | 9/2004 | Hanson | F24F 11/0086 62/125 |
| 2005/0121064 A1 * | 6/2005 | Seo | H01L 23/38 136/200 |
| 2005/0273217 A1 * | 12/2005 | Frashure | H04L 12/12 701/2 |
| 2006/0196211 A1 * | 9/2006 | Ludwig | F25B 49/025 62/323.4 |
| 2007/0100513 A1 | 5/2007 | Asano | |
| 2007/0296379 A1 | 12/2007 | Gendron | |
| 2008/0009982 A1 * | 1/2008 | Frashure | H04L 12/12 701/1 |
| 2008/0087029 A1 | 4/2008 | Renken et al. | |
| 2008/0219288 A1 * | 9/2008 | Binder | H04B 3/54 370/463 |
| 2008/0221761 A1 * | 9/2008 | Shimoda | G07C 9/00309 701/54 |
| 2009/0133419 A1 | 5/2009 | Matsuno et al. | |
| 2009/0299530 A1 | 12/2009 | Burnham et al. | |
| 2009/0299534 A1 * | 12/2009 | Ludwig | F25B 27/00 700/278 |
| 2010/0032246 A1 * | 2/2010 | Kattainen | B66B 1/30 187/305 |
| 2010/0171364 A1 * | 7/2010 | Awwad | B60H 1/3226 307/9.1 |
| 2011/0000244 A1 * | 1/2011 | Reason | B60H 1/00428 62/323.3 |
| 2011/0046854 A1 | 2/2011 | Kooi | |
| 2011/0088411 A1 * | 4/2011 | Steele | B60H 1/00014 62/61 |
| 2011/0202163 A1 | 8/2011 | Kim et al. | |
| 2011/0295436 A1 | 12/2011 | Haynes et al. | |
| 2012/0000212 A1 * | 1/2012 | Sanders | F25D 29/003 62/62 |
| 2012/0240591 A1 | 9/2012 | Snider et al. | |
| 2013/0147624 A1 * | 6/2013 | Fragnito | G08B 29/181 340/540 |
| 2013/0158700 A1 * | 6/2013 | Scherenberger | B64D 9/00 700/213 |
| 2013/0204443 A1 * | 8/2013 | Steven | G06Q 50/06 700/286 |
| 2013/0289762 A1 * | 10/2013 | Olaleye | G05B 19/4189 700/228 |
| 2014/0020414 A1 * | 1/2014 | Rusignuolo | B60H 1/00364 62/115 |
| 2014/0026599 A1 * | 1/2014 | Rusignuolo | F25B 49/025 62/56 |
| 2014/0062228 A1 * | 3/2014 | Carpenter | H02K 9/24 310/53 |
| 2014/0277820 A1 * | 9/2014 | Mixon | G05D 23/1919 700/300 |
| 2014/0345301 A1 * | 11/2014 | Steele | B60P 3/20 62/61 |
| 2014/0373747 A1 * | 12/2014 | Yagci | B60L 8/003 104/290 |
| 2015/0033775 A1 * | 2/2015 | Cohen | F25D 29/003 62/89 |
| 2015/0040598 A1 * | 2/2015 | Steele | B60K 6/12 62/239 |
| 2015/0121923 A1 * | 5/2015 | Rusignuolo | B60H 1/00428 62/126 |

FOREIGN PATENT DOCUMENTS

| | | |
|---|---|---|
| EP | 2823172 | 1/2015 |
| JP | 2010286149 | 12/2010 |
| KR | 20120037478 | 4/2012 |
| WO | 2011130087 | 10/2011 |
| WO | 2012047499 | 4/2012 |
| WO | 2013/134238 | 9/2013 |
| WO | 2013/134355 | 9/2013 |
| WO | 2013/134453 | 9/2013 |

OTHER PUBLICATIONS

International Search Report and Written Opinion issued in PCT/US2013/038828 dated Aug. 21, 2013 (9 pages).

* cited by examiner

TRANSPORT REFRIGERATION SYSTEM CONTROLLER TO ENGINE CONTROL UNIT INTERFACE

FIELD OF TECHNOLOGY

The embodiments disclosed here generally relate to transport refrigeration systems. More specifically, the embodiments described herein relate to a transport refrigeration system (TRS) controller to engine control unit (ECU) interface.

BACKGROUND

Existing transport refrigeration systems are used to cool containers, trailers, and other similar transport units. Some transport units may be efficiently stacked for shipment by ship or rail. When transport units are shipped by a truck, a single container is placed on a container chassis. When cargo in the transport unit includes perishable products (e.g., food product, flowers, etc.), the temperature of the transport unit may be controlled to limit spoilage of the cargo during shipment.

Some existing transport units include a generator set that supplies power to temperature-controlling components of the transport refrigeration system. These generator sets are typically attached directly to the container or container chassis, and include an engine to power a generator, as well as a fuel container to supply fuel to the generator sets.

SUMMARY

The embodiments described herein relate to a transport refrigeration system (TRS) controller to engine control unit (ECU) interface.

In particular, the embodiments described herein allow a non-industrial engine (e.g., an automotive engine) to be integrated in the TRS.

Advantages of the embodiments described herein include reducing the amount of current drawn from a battery while the TRS is in non-running modes, eliminating redundancy in TRS resources, reducing the wiring harness, allowing for engine diagnostics and services while the TRS is running in an electrical mode, providing redundant safety against unintended system startup, and improving low voltage start-ability performance.

Other aspects of the invention will become apparent by consideration of the detailed description and accompanying drawings.

DETAILED DESCRIPTION

The embodiments described herein relate to a TRS controller to ECU interface.

In the following description of the illustrated figures, embodiments for a TRS controller to ECU interface are provided. These embodiments can reduce the amount of current drawn from a battery while the TRS is in non-running modes, eliminate redundancy in TRS resources, reduce the wiring harness, allow for engine diagnostics and services while the TRS is running in a shore power electrical mode, provide redundant safety against unintended system startup, and improve low voltage start-ability performance.

References are made to the accompanying drawings that form a part hereof, and in which is shown by way of illustration of the embodiments in which the embodiments may be practiced. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. It is to be understood that the phraseology and terminology used herein is for the purpose of description and should not be regarded as limiting.

It will be appreciated that the embodiments described herein are not limited to trucks, trailers and container units. The embodiments described herein may be used in any other suitable temperature controlled apparatuses such as a ship board container, an air cargo cabin, an over the road truck cabin, etc. The TRS may be a vapor-compressor type refrigeration system, or any other suitable refrigeration systems that can use refrigerant, cold plate technology, etc.

Figure 1:
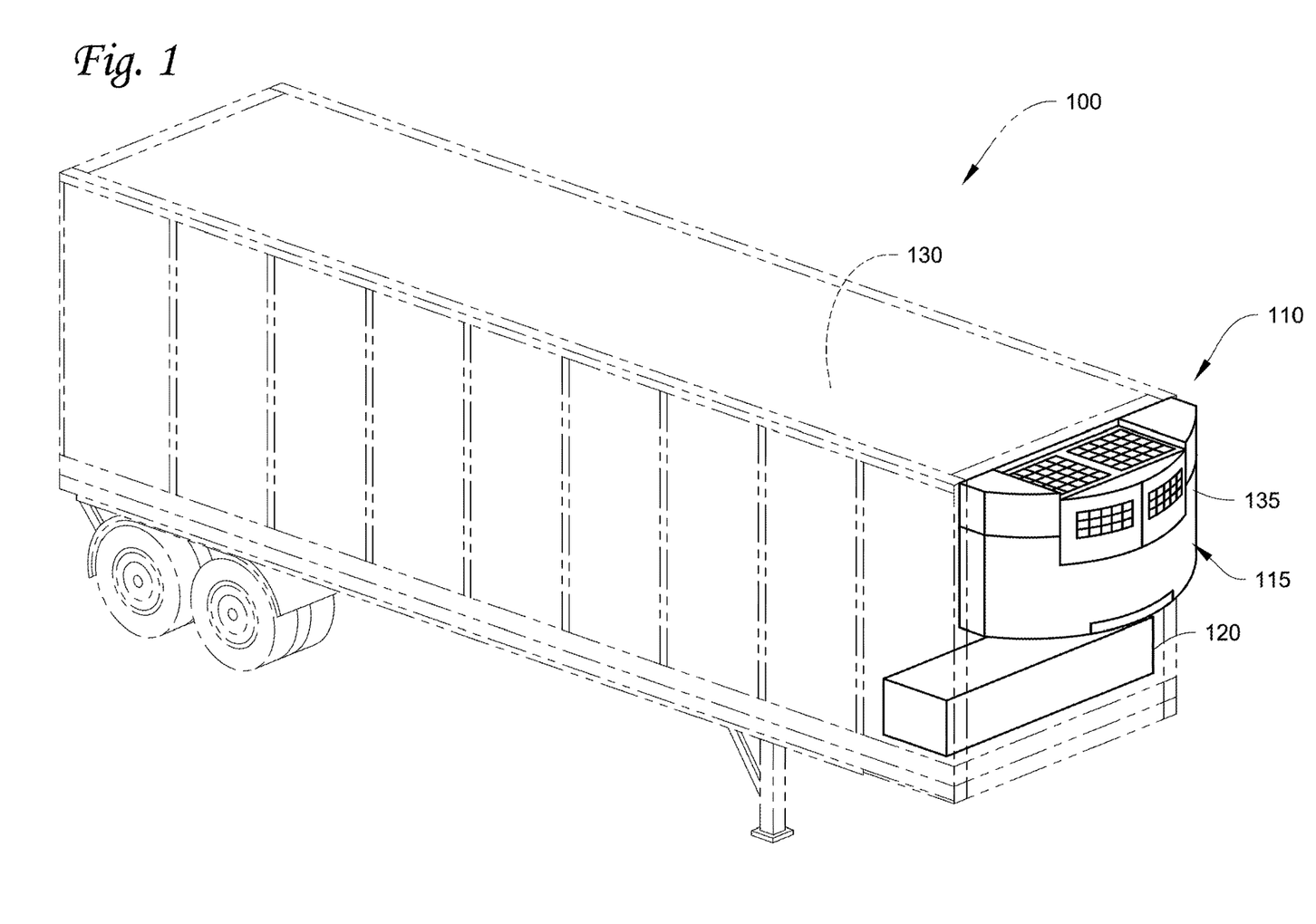
FIG. 1 illustrates an elevated perspective view of a transport container unit with a transport refrigeration system, according to one embodiment.

FIG. 1 illustrates an elevated perspective view of a transport unit 100 that has a TRS 110. The TRS 110 includes a TRU 115 connected to a generator set 120. The TRU 115 draws power from the generator set 120. The TRU 115 is configured to transfer heat between an internal space 130 of the transport unit 100 and the outside environment. In some embodiments, the TRS 110 is a multi-zone system in which different zones or areas of the internal space 130 are controlled to meet different refrigeration requirements based on the cargo stored in the particular zone.

As shown in FIG. 1, the TRU 115 is positioned adjacent to a front side of the transport unit 100 and is enclosed in a housing 135. The TRU 115 is in communication with the space 130 and controls the temperature in the space 130. The TRU 115 includes a TRS Controller (not shown) that regulates various operating conditions (e.g., temperature, humidity, etc.) of the space 130 and is powered by the generator set 120. The TRU 115 also includes a closed refrigerant circuit (not shown). The closed refrigerant circuit regulates various operating conditions (e.g., temperature, humidity, etc.) of the space 130, and includes an Electronic Throttle Valve (ETV), a compressor coupled to a condenser and an evaporator that cools the space 130 and the perishable cargo. Generally, the compressor requires the most energy among different components of the TRS 110 and is the primary contributor of the load seen by an engine (not shown) of the generator set 120.

The generator set 120 generally includes an engine, an electronic controller unit (ECU) (not shown), a fuel container (not shown) and a generator (not shown). The engine may be an internal combustion engine (e.g., diesel engine, etc.) that may generally have a cooling system (e.g., water or liquid coolant system), an oil lubrication system, and an electrical system (none shown). An air filtration system (not shown) filters air directed into a combustion chamber (not shown) of the engine. In some embodiments the engine is not specifically configured for the TRS 110, but can be a non-industrial engine such as, for example, an automotive engine. The fuel container is in fluid communication with the engine to deliver a supply of fuel to the engine.

The engine is further controlled by the ECU. The ECU can be configured to regulate an amount of fuel delivered to the engine and can be configured to operate the engine at least multiple speeds. The ECU is generally configured to allow the engine to be maintained at a chosen speed regardless of the load seen by the engine. As discussed in more detail below, the ECU is connected to and communicates with the TRS Controller.

While the transport unit 100 in FIG. 1 is directed to a trailer type transport unit, it will be appreciated that the embodiments directed to a TRS Controller to ECU interface in the TRS 110 can also be used, for example, in a truck type transport unit, a container type transport unit, etc.

Figure 2A:
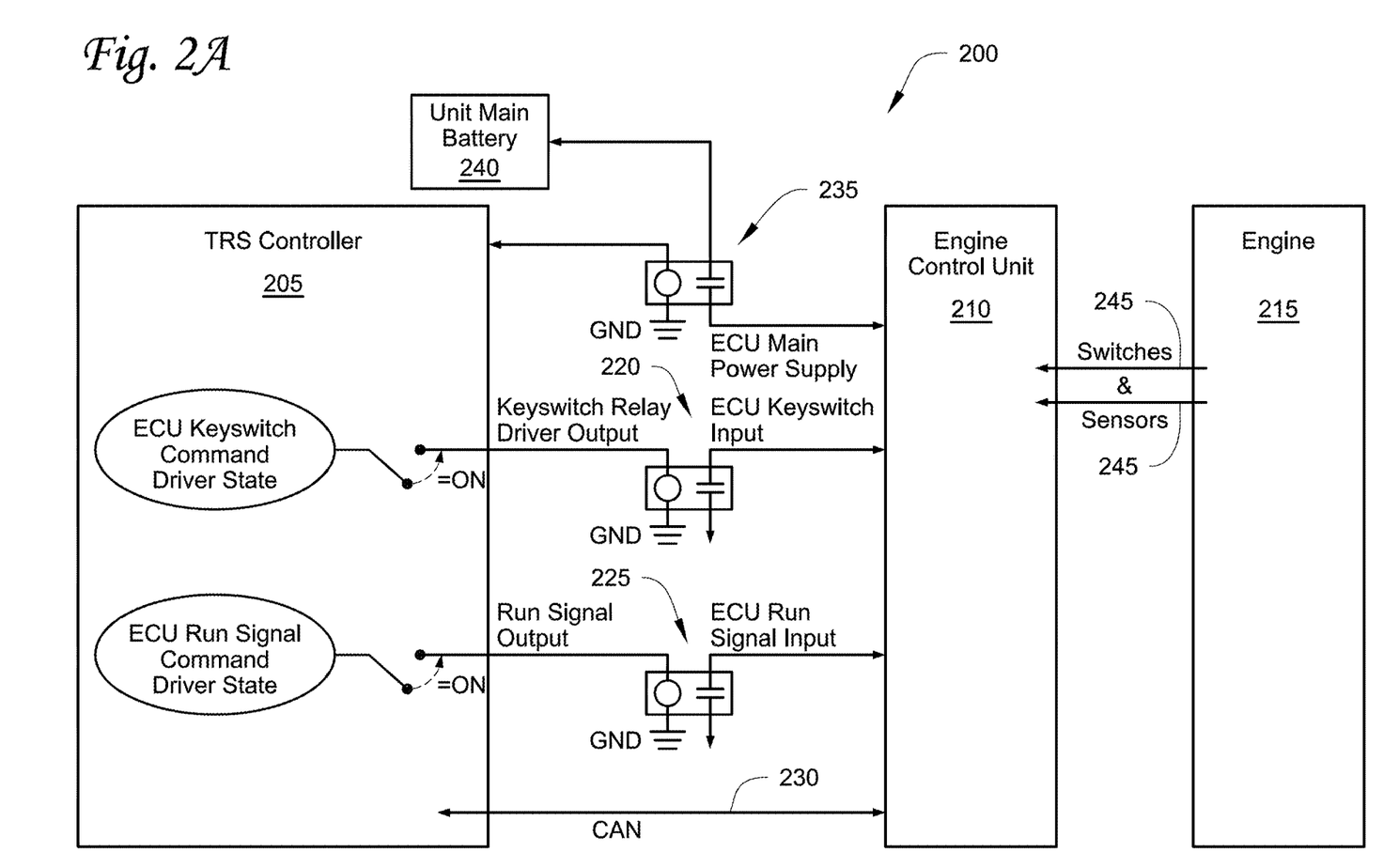
FIG. 2A illustrates one schematic of a TRS Controller to ECU interface, according to a first embodiment.
Figure 2B:
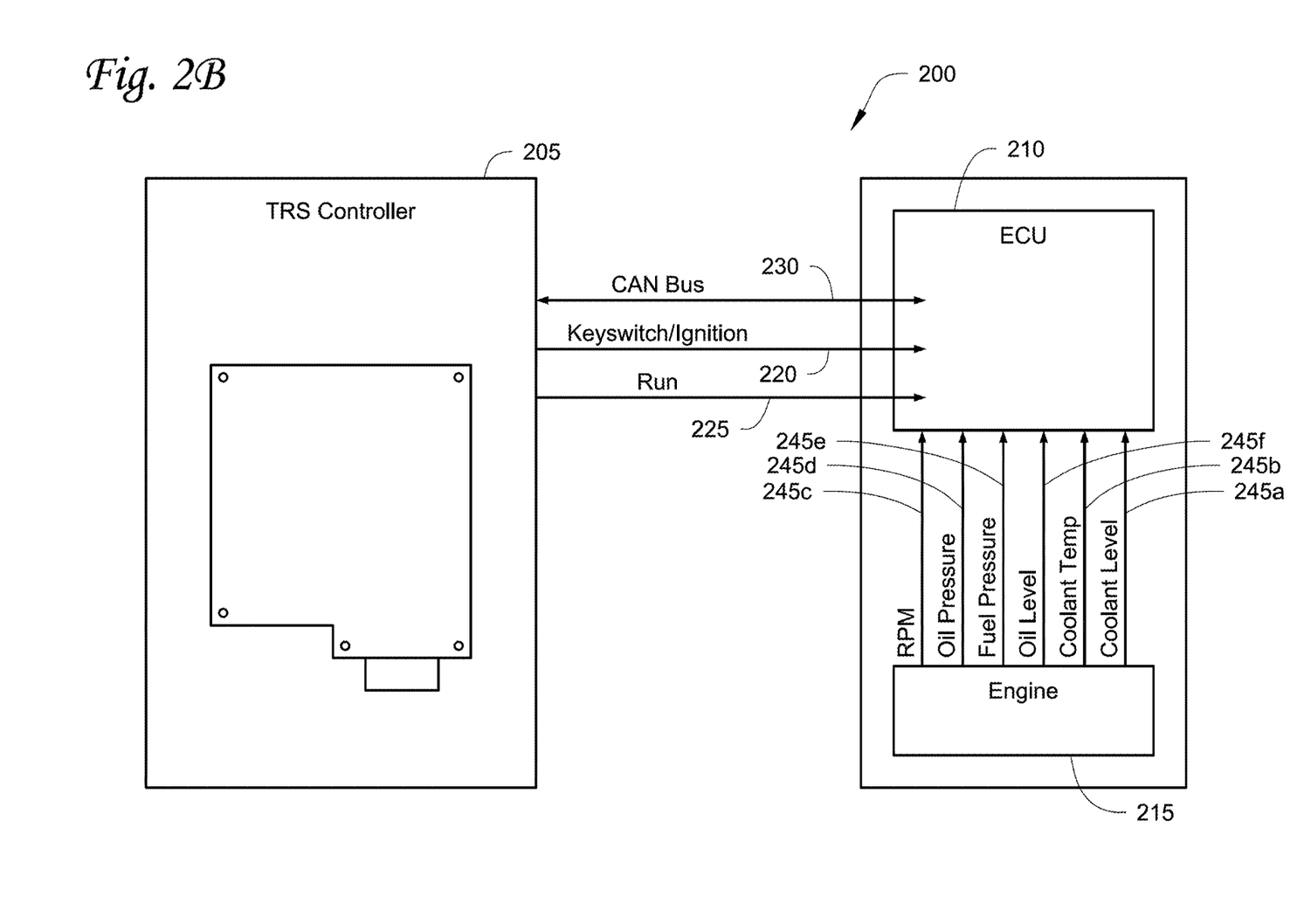
FIG. 2B illustrates another schematic of a TRS Controller to ECU interface, according to a first embodiment.

FIGS. 2A and 2B illustrate two schematics of a TRS Controller to ECU interface 200 according to a first embodiment. The interface 200 includes a IRS Controller 205 connected to an ECU 210 that is part of an engine 215. The interface 200 includes a keyswitch connection 220 that is configured to send a keyswitch message from the TRS Controller 205 to the ECU 210, a run signal connection 225 that is configured to send a run message from the TRS Controller 205 to the ECU 210, and a Controller Area Network (CAN) communication connection 230 that is configured to provide two-way communication between the TRS Controller 205 and the ECU 210.

The interface 200 also includes a main battery connection 235 for providing power from a main battery 240 to the TRS Controller 205 and the ECU 210. In one embodiment, the main battery 240 is a 12 volt battery.

In some embodiments, the keyswitch connection 220 and the run signal connection 225 are wired connections. Also, in some embodiments, the CAN communication connection 230 is a wireless connection in which digital data messages can be transmitted between the TRS Controller 205 and the ECU 210. In some embodiments, the CAN communication connection 230 is configured to transmit and receive data using a wireless communication protocol such as, for example, ZigBee, Bluetooth, or any other type of wireless communication protocol that allows for accurate transmission of data between the TRS Controller 205 and the ECU 210 during transport.

The keyswitch connection 220 is configured to enable the ECU 210 for Engine Sub-System operation, disable the ECU 210, and to facilitate TRS power management. In one embodiment, the keyswitch connection 220 can perform the above functions by invoking a high/active logic state and/or a low/inactive logic state. When in the high/active logic state, the keyswitch connection 220 is configured to enable communication between the TRS Controller 205 and the engine 215 via the ECU 210. When the keyswitch connection 220 transitions from the high/active logic state to the low/inactive logic state, the ECU 210 is configured to enter a power latch stage prior to completely shutting off The ECU 210 is configured to command a pre-shutdown component calibration and is configured to write data to permanent memory.

The run signal connection 225 is configured to, via the ECU 210, prepare the engine 215 for starting, instructing the engine 215 to stop, reinitializing an ECU 210 start routine, and managing power consumption of the TRS generally. In one embodiment, the run signal connection 225 can perform the above functions by invoking a high/active logic state and/or a low/inactive logic state. When in the high/active logic state, the run signal connection 225 is configured to prepare the engine 215, via the ECU 210, for starting. When the run signal connection 225 transitions from the high/ active logic state to the low/inactive logic state and the engine 215 is running, the run signal connection 225 is configured to instruct the engine 215, via the ECU 210, to stop. This reduces power consumption of the main battery 240 while still allowing data communication between the ECU 210 and TRS Controller 205 via the CAN communication connection 230.

The CAN communication connection 230 is configured to facilitate communication between the TRS Controller 205 and the ECU 210. In particular, the CAN communication connection 230 is configured to transmit data messages from the TRS Controller 205 to the ECU 210 that include, for example, an engine crank command message, an engine target speed command message, an engine stop request message, etc. Accordingly, the TRS Controller 205 can instruct the engine 215, via the ECU 210, to stop via the run signal connection 225 or the CAN communication connection 230.

The engine 215 includes one or more switches and sensors 245 that provide information to the ECU 210. For example, as shown in FIG. 2B, the one or more switches sensors 245 can include, for example, a coolant level sensor 245a, a coolant temperature sensor 245b, an engine speed sensor 245c, an oil pressure sensor 245d, a fuel pressure sensor 245e, an oil level sensor 245f, etc. However, in some embodiments, the engine 215 does not include a magnetic pickup engine speed sensor. Also, in some embodiments, the engine 215 is an electronically controlled Tier-4 Engine. Information from one or more of the sensors 245 can be sent to the TRS controller 205 via the CAN communication connection 230.

In some embodiments, the interface 200 can be configured to provide reliable real-time engine speed signal feedback during engine cranking of the engine 215. In particular, the ECU 210 includes a camshaft speed sensor and a crankshaft speed sensor that are configured to compute engine speeds of the engine 215, as opposed to a magnetic pickup engine speed sensor. In some embodiments, the ECU 210 is configured such that these sensors are not accessible for third party interfacing. Information from the camshaft speed sensor and/or the crankshaft speed sensor can be sent to the TRS controller 205 via the CAN communication connection 230.

In some embodiments, the interface 200 can be configured to provide starter reliability of the engine 215. A latency period between a IRS commanded starter engagement action and an appropriate TRS Controller 205 reaction based on an ECU 210 response can be significantly longer, for example, when compared to a conventional starting algorithm that uses a direct mag-pickup sensor input to the IRS Controller 205. For example, a cycle that includes: starter engagement; engine rotation above, for example, ~50 RPM-engine speed computation by the ECU 210; transmission of engine speed to the TRS Controller 205; reception by TRS Controller 205; appropriate TRS Controller 205 action command, has the potential of causing the starter engagement to be active for too long.

However, in the interface 200, while the TRS Controller 205 can initiate the start of the engine 215 and can stop the engine 215 by setting the run signal communication connection 225 to the low/inactive state or by sending a CAN message via the CAN communication connection 230, the ECU 210 can provide protection for the starter. In particular, camshaft and crankshaft information, provided by the camshaft speed sensor and the crankshaft speed sensor of the ECU 210, can be used by the ECU 210 to determine if the crank cycle should be terminated due to a fault condition (such as, for example, engine speed rotation that is below a minimum threshold) or due to exceeding a maximum hold the starter time period.

In some embodiments, the interface 200 can be configured to provide ECU 210 operation during low voltage conditions. That is, the interface 200 is configured to allow the ECU 210 to operate in cranking situations where the battery voltage of the main battery 240 is low below a minimum main battery 240 voltage threshold prior to cranking. In such conditions, the interface 200 is configured such that CAN messages via the CAN communication connection 230 are intermittent or non-existent for short periods of time during the cranking phase.

In some embodiments, the interface 200 can be configured to prevent the use of duplicate engine switches and sensors 245. For example, the interface 200 is configured such that the ECU 210 can determine real-time engine speed information of the engine 215 using the camshaft speed sensor and the crankshaft speed sensor within the ECU. Accordingly, a magnetic pickup engine speed sensor is not needed to provide real-time engine speed information of the engine 215.

Also, the interface 200 separates a single input keyswitch connection to provide the keyswitch connection 220 and the run signal connection 225. Accordingly, when the ECU 210 is an automotive ECU, a single input keyswitch connection 220 can be provided to enable and disable the ECU 210. This scheme can work for automotive purposes because pre-cranking diagnostics are generally not required.

In some embodiments, the interface 200 can be configured to prevent depletion of the main battery 240 due to engine components of the engine 215 that are controlled by the ECU 210. In particular, addition of the ECU 210 to the main battery 240 can result in an additional burden of ~3 amps to ~38 amps when the ECU 210 is active but TRS is in a fuel conserving Cycle Sentry Null mode in which the TRS is shut down temporarily when the main battery 240 is fully charged, a coolant temperature is satisfied and a temperature within the space of the transport unit is satisfied. That is, when the run signal connection 225 is in the low/inactive logic state, the interface 200 is configured to deactivate inactive components of the TRS that consume large quantities of power.

In some embodiments, the interface 200 can be configured to provide engine information of the engine 215 to the TRS Controller 205 (via, e.g., the CAN communication connection 230) during and after a shutdown of the engine 215. That is, the keyswitch connection 220 can be kept in a high/active logic state, regardless of the logic state of the run signal connection 225, to allow engine information of the engine 215 to be sent to the TRS Controller 205 during and after a shutdown of the engine 215. In a conventional automotive ECU, a single input enable/disable signal invokes an engine shutdown command upon removal of the signal after which engine information cannot be exchanged with the TRS Controller 205. However, as the keyswitch and the run signal are separated in the interface 200, the TRS Controller 205 can obtain certain diagnostics information from the engine 215 while in a Cycle Sentry Null Mode and a Sleep Mode.

In some embodiments, power consumption by the main battery 240 when the keyswitch connection 220 and the run signal connection 225 are both in a high/active logic state can exceed, for example, ~45 amps. However, when the keyswitch connection 220 is in a high/active logic state and the run signal connection 225 is in a low/inactive logic state, power consumption of the may battery 240 can be, for example, between ~1 to ~3 amps.

In some embodiments, the interface 200 can be configured to provide cold weather battery power management of the main battery 240 via the run signal connection 225. Conventionally, a glow plug of an engine is configured to be activated based on an ambient temperature every time a keyswitch connection is transitioned from the low/inactive logic state to the high/active logic state. However, the keyswitch connection can be transitioned from the low/inactive logic state to the high/active logic state for the purposes of a non-running pre-trip service test mode or other service modes. Thus, transition from the low/inactive logic state to the high/active logic state of the keyswitch can cause the glow plug to activate thereby unnecessarily depleting the main battery. In contrast, the interface 200 can provide cold weather power management of the main battery 240 without activating the keyswitch connection 220.

In some embodiments, the interface 200 can be configured to provide engine data acquisition of the engine 215 when the run signal connection 225 is set to a high/active logic state regardless of the logic state of the keyswitch connection 220. Accordingly, the interface 200 can be configured such that engine data acquisition of the engine 215 can occur even when the engine 215 is not running In some embodiments, the interface 200 can be configured to reduce costs associated with including redundant sensors and excessive interface harnessing by using sensors that are already installed on the engine subsystem such as, for example, a crankshaft speed sensor, a camshaft speed sensor, etc.

Figure 3:
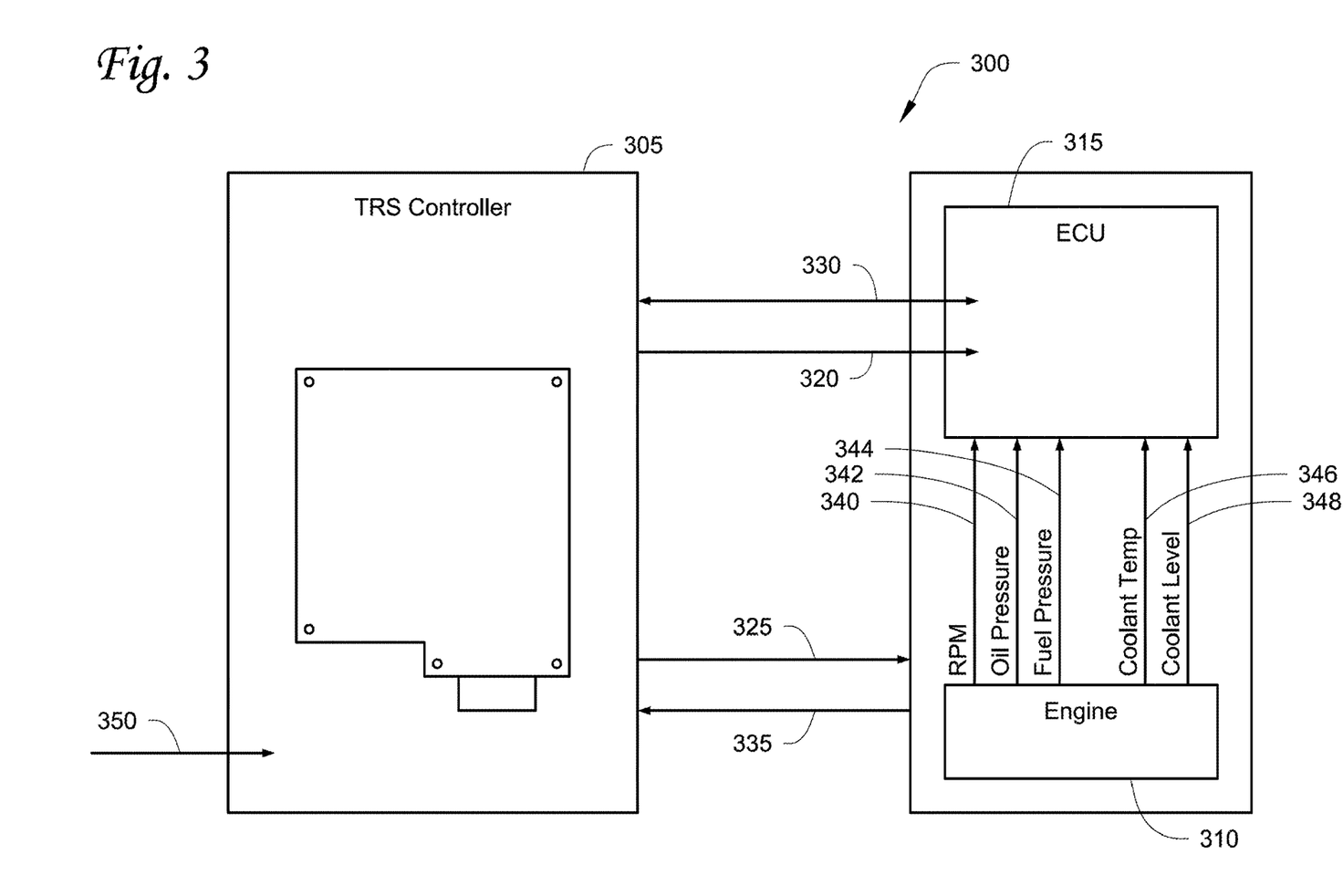
FIG. 3 illustrates a schematic of a TRS Controller to ECU interface, according to a second embodiment.

FIG. 3 illustrates a schematic of a TRS Controller to ECU interface 300 according to a second embodiment. The interface 300 includes a TRS Controller 305 connected to an engine 310 and an ECU 315. The interface 300 includes a run signal/keyswitch/ignition connection 320 that is configured to send a run signal/keyswitch/ignition message from the TRS Controller 305 to the ECU 315, a starter connection 325 that is configured to send a start message from the TRS Controller 305 to the engine 310, and a CAN communication connection 330 that is configured to provide two-way communication between the TRS Controller 305 and the ECU 315. The interface 300 also includes a magnetic pickup engine speed sensor 335 that is configured to provide real-time engine speed information of the engine 310 directly to the TRS Controller 305.

The engine 310 also includes an engine speed sensor 340, an oil pressure sensor 342, a fuel pressure sensor 344, a coolant temperature sensor 346 and a coolant level sensor 348 that provide information to the ECU 315. Also, in this embodiment, a coolant temperature sensor 350 is connected directly to the TRS Controller 305 to provide a coolant temperature of the coolant in the engine 310.

In this embodiment, the interface 300 provides two stage engine operation of the engine 310 with redundant safety mechanisms. In particular, a keyswitch operation and a run signal operation are interlocked such that keyswitch messages and run signal messages are sent via the run signal/keyswitch/ignition connection 320. The interface 300 also provides diagnosis and service operations of the engine 310 while running. The interface 300 also provides increased cold starting performance and cost reduction due to the elimination of redundant system sensors.

The run signal/keyswitch/ignition connection 320 is configured to enable the engine 310 for Engine Sub-System operation, disable the ECU 315, and to facilitate TRS power management. In one embodiment, the run signal/keyswitch/ignition connection 320 can perform the above functions by invoking a high/active logic state and/or a low/inactive logic state. When in the high/active logic state, the run signal/keyswitch/ignition connection 320 is configured to enable communication between the TRS Controller 305 and the ECU 315. When the run signal/keyswitch/ignition connection 320 transitions from the high/active logic state to the low/inactive logic state, the ECU 315 instructs the engine 310 to enter a power latch stage prior to completely shutting off. The ECU 310 is configured to command a pre-shutdown component calibration and is configured to write data to permanent memory.

The run signal/keyswitch/ignition connection 320 is also configured to instruct the ECU 315 to prepare the engine 310 for starting, instruct the engine 310 to stop, reinitialize an ECU 315 start routine, and manage power consumption of the main battery (not shown). In one embodiment, the run signal/keyswitch/ignition connection 320 can perform the above functions by invoking a high/active logic state and/or a low/inactive logic state. When in the high/active logic state, the run signal/keyswitch/ignition connection 320 is configured to instruct the ECU 315 to prepare the engine 310 for starting. When the run signal/key-switch/ignition connection 320 transitions from the high/active logic state to the low/inactive logic state and the engine 310 is running, the run signal/keyswitch/ignition connection 320 is configured to instruct the ECU 315 to stop the engine 310. This reduces power consumption of the main battery (not shown) while still allowing data communication between the ECU 315 and the TRS Controller 305 via the CAN communication connection 330.

The CAN communication connection 330 is configured to facilitate communication between the TRS Controller 305 and the ECU 315. In particular, the CAN communication connection 330 is configured to transmit data messages from the TRS Controller 305 to the ECU 315 that include, for example, an engine crank command message, an engine target speed command message, an engine stop request message, etc. Accordingly, the TRS Controller 305 can instruct the ECU 315 to stop the engine 310 via the run signal/keyswitch/ignition connection 320 or the CAN communication connection 330.

The magnetic pickup speed sensor 335 is configured to provide reliable real-time feedback of engine speed during operation of the engine 310. In this embodiment, the interface 300 delegates physical control of the starter to the ECU 315 instead of the TRS Controller 305. This allows the TRS Controller 305 to send a digital message to the ECU 315 via the CAN communication connection 330 and allows the ECU 315 to complete the task of getting the engine 310 from 0 RPM to target speed while also checking for failed to start attributes.

Figure 4:
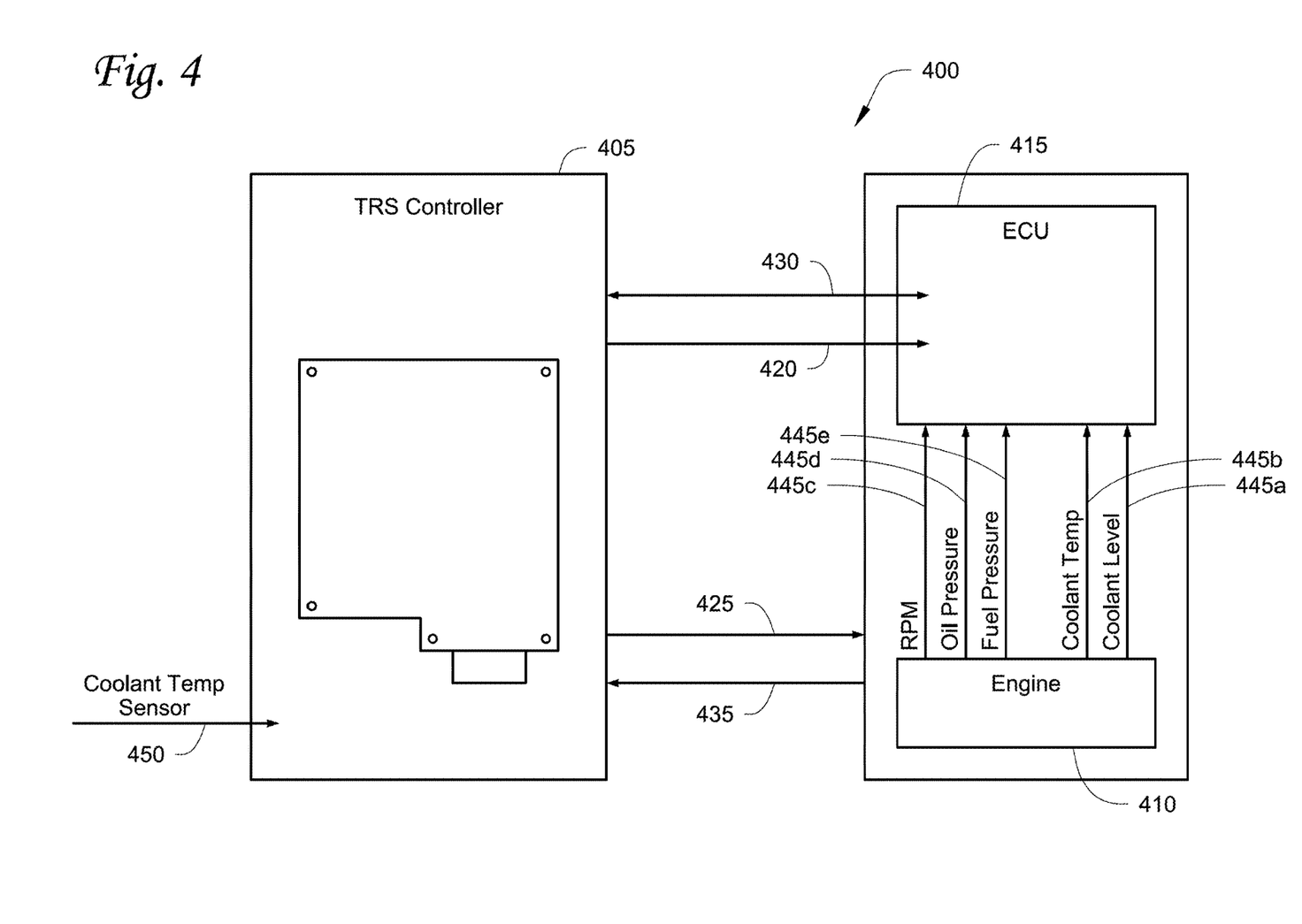
FIG. 4 illustrates a schematic of a TRS Controller to ECU interface, according to a third embodiment.

FIG. 4 illustrates a schematic of a TRS Controller to ECU interface 400 according to a third embodiment. The interface 400 includes a TRS Controller 405 connected to an engine 410 and an ECU 415. The interface 400 includes an ignition connection 420 that is configured to send an ignition message from the TRS Controller 405 to the ECU 415, a starter connection 425 that is configured to send a start message from the TRS Controller 405 to the engine 410, and a CAN communication connection 430 that is configured to provide two-way communication between the TRS Controller 405 and the ECU 415. The interface 400 also includes a magnetic pickup engine speed sensor 435 that is configured to provide real-time engine speed information of the engine 410 directly to the TRS Controller 405.

The engine 410 includes, for example, a coolant temperature sensor 445a, a coolant level sensor 445b, an engine speed sensor 445c, an oil pressure sensor 445d, and a fuel pressure sensor 445e that provide information to the ECU 415. Also, in this embodiment, a coolant temperature sensor 450 is connected directly to the TRS Controller 405 to provide a coolant temperature of the coolant in the engine 410.

Figure 5:
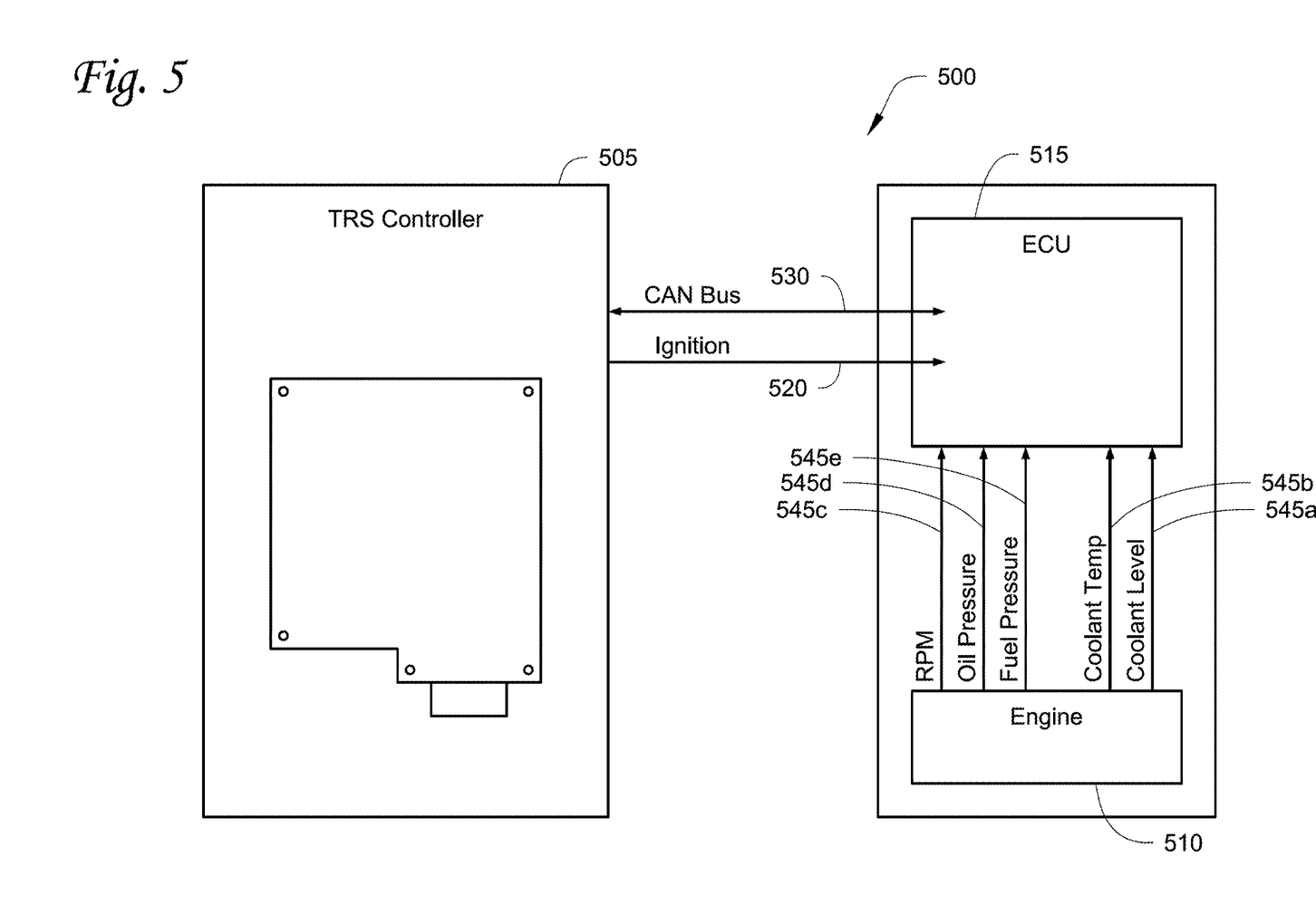
FIG. 5 illustrates a schematic of a TRS Controller to ECU interface, according to a fourth embodiment.

FIG. 5 illustrates a schematic of a TRS Controller to ECU interface 500 according to a fourth embodiment. The interface 500 includes a TRS Controller 505 connected to an ECU 515. The interface 500 includes an ignition connection 520 that is configured to send an ignition message from the TRS Controller 505 to the ECU 515 and a CAN communication connection 530 that is configured to provide two-way communication between the TRS Controller 505 and the ECU 515.

The engine 510 includes, for example, a coolant temperature sensor 545a, a coolant level sensor 545b, an engine speed sensor 545c, an oil pressure sensor 545d, and a fuel pressure sensor 545e that provide information to the ECU 515.

Aspects:
1. A transport refrigeration system (TRS) controller-to-electronic control unit (ECU) interface for a TRS of a refrigerated transport unit comprising:
   a TRS controller programmed to regulate operating conditions within the refrigerated transport unit;
   an ECU of an electronically controlled engine configured to provide power to the TRS, wherein the ECU is programmed to control the electronically controlled engine;
   a controller area network (CAN) communication connection between the TRS controller and the ECU, wherein the CAN communication connection is configured to facilitate two way communication between the TRS controller and the ECU.
2. The TRS controller-to-ECU interface of aspect 1, wherein the CAN communication connection is configured to transmit a data message from the IRS controller to the ECU, wherein the data message is at least one of: an engine crank command message; an engine target speed command message; and an engine stop request message.
3. The TRS controller-to-ECU interface of aspects 1-2, wherein the CAN communication connection is a wireless communication connection that is configured to transmit and receive a data message using a wireless communication protocol.
4. The TRS controller-to-ECU interface of aspects 1-3, further comprising a keyswitch connection between the TRS controller and the ECU, the keyswitch connection being configured to enable the ECU for an engine subsystem operation.
5. The TRS controller-to-ECU interface of aspect 4, wherein when the keyswitch connection is in an active logic state, the keyswitch connection is configured to enable communication between the TRS controller and the electronically controlled engine via the ECU, and when the keyswitch connection transitions from an active logic state to an inactive logic state, the ECU is configured to enter a power latch stage and command a pre-shutdown component calibration of the electronically controlled engine.
6. The TRS controller-to-ECU interface of aspects 4-5, wherein when the keyswitch connection is in an active logic state, the TRS controller-to-ECU interface is configured to provide the TRS controller engine information of the electronically controlled engine during and after a shutdown of the electronically controlled engine.

7. The TRS controller-to-ECU interface of aspects 1-6, further comprising a run signal connection between the TRS controller and the ECU, the run signal being configured to prepare the electronically controlled engine for starting and stopping, wherein when the run signal connection is in an active logic state, the ECU is configured to prepare the electronically controlled engine for starting, and when the run signal connection transitions from an active logic state to an inactive logic state, the ECU is configured to instruct the electronically controlled engine to stop.

8. The IRS controller-to-ECU interface of aspect 7, wherein when the run signal connection is in an inactive logic state, the TRS controller-to-ECU interface is configured to deactivate inactive components of the TRS.

9. The TRS controller-to-ECU interface of aspects 1-8, further comprising an ignition connection between the TRS controller and the ECU, the ignition connection being configured to send an ignition message from the TRS controller to the ECU.

10. The TRS controller-to-ECU interface of aspects 1-9, further comprising a keyswitch/ignition connection between the TRS controller and the ECU, the keyswitch/ignition connection being configured to enable the ECU for an engine sub-system operation and being configured to enable the ECU for an engine sub-system operation, wherein when the keyswitch/ignition connection is in an active logic state, the keyswitch/ignition connection is configured to enable communication between the TRS controller and the electronically controlled engine via the ECU, and when the keyswitch/ignition connection transitions from an active logic state to an inactive logic state, the ECU is configured to enter a power latch stage and command a pre-shutdown component calibration of the electronically controlled engine.

11. The IRS controller-to-ECU interface of aspects 1-10, further comprising a run/keyswitch/ignition connection between the TRS controller and the ECU, the run/keyswitch/ignition connection being configured to prepare the electronically controlled engine for starting and stopping, being configured to enable the ECU for an engine sub-system operation and being configured to enable the ECU for an engine sub-system operation, wherein when the run/keyswitch/ignition connection is in an active logic state, the run/keyswitch/ignition connection is configured to enable communication between the TRS controller and the electronically controlled engine via the ECU, and when the run/keyswitch/ignition connection transitions from an active logic state to an inactive logic state, the ECU is configured to enter a power latch stage and command a pre-shutdown component calibration of the electronically controlled engine, and wherein when the run/keyswitch/ignition signal connection is in an active logic state, the ECU is configured to prepare the electronically controlled engine for starting, and when the run/keyswitch/ignition signal connection transitions from an active logic state to an inactive logic state, the ECU is configured to instruct the electronically controlled engine to stop.

12. The TRS controller-to-ECU interface of aspects 1-11, further comprising a starter connection between the TRS controller and the electronically controlled engine, the starter connection being configured to send a start message from the TRS controller to the electronically controlled engine for starting the electronically controlled engine.

13. The TRS controller-to-ECU interface of aspects 1-12, further comprising a magnetic pickup engine speed sensor that is configured to provide real-time engine speed information of the electrically controlled engine to the TRS Controller directly from the electronically controlled engine.

14. The TRS controller-to-ECU interface of aspects 1-13, further comprising a coolant temperature sensor that is configured to directly provide a coolant temperature of a coolant in the electronically controlled engine to the TRS controller.

15. The TRS controller-to-ECU interface of aspects 1-14, wherein the ECU includes one or more engine information sensors configured to determine: a coolant level; a coolant temperature; an engine speed; an oil pressure; a fuel pressure; and an oil level, wherein the ECU is configured to transmit engine information from the one or more sensors to the TRS controller via the CAN communication bus.

16. The TRS controller-to-ECU interface of aspects 1-15, wherein when the keyswitch connection is in an active logic state, the TRS controller-to-ECU interface is configured to provide the TRS controller engine information of the electronically controlled engine during and after a shutdown of the electronically controlled engine.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

What claimed is:

1. A transport refrigeration system (TRS) controller-to-engine control unit (ECU) interface for a TRS of a transport unit comprising:

a TRS controller programmed to regulate operating conditions within the transport unit;

an ECU of an electronically controlled engine, the electronically controlled engine configured to provide power to the TRS, wherein the ECU is programmed to control the electronically controlled engine;

a controller area network (CAN) communication connection between the TRS controller and the ECU, wherein the CAN communication connection is configured to facilitate two way communication between the TRS controller and the ECU; and a secondary connection between the TRS controller and the ECU, the secondary connection being configured to enable the ECU for an engine sub-system operation, and the secondary connection configured to be in an active logic state and an inactive logic state, wherein when the secondary connection is in the active logic state, the secondary connection is configured to enable communication between the TRS controller and the electronically controlled engine via the ECU, and when the secondary connection transitions from the active logic state to the inactive logic state, the ECU is configured to enter a power latch stage and command a pre-shutdown component calibration of the electronically controlled engine.

2. The TRS controller-to-ECU interface of claim 1, wherein the CAN communication connection is configured to transmit a data message from the TRS controller to the ECU, wherein the data message is at least one of: an engine crank command message; an engine target speed command message; and an engine stop request message.

3. The TRS controller-to-ECU interface of claim 1, wherein the CAN communication connection is a wireless communication connection that is configured to transmit and receive a data message using a wireless communication protocol.

4. The TRS controller-to-ECU interface of claim 1, wherein when the secondary connection is in an active logic state, the TRS controller-to-ECU interface is configured to provide the TRS controller engine information of the electronically controlled engine during and after a shutdown of the electronically controlled engine.

5. The TRS controller-to-ECU interface of claim 1, further comprising a run signal connection between the TRS controller and the ECU, the run signal being configured to prepare the electronically controlled engine for starting and stopping,
wherein when the run signal connection is in an active logic state, the ECU is configured to prepare the electronically controlled engine for starting, and when the run signal connection transitions from an active logic state to an inactive logic state, the ECU is configured to instruct the electronically controlled engine to stop.

6. The TRS controller-to-ECU interface of claim 5, wherein when the run signal connection is in an inactive logic state, the TRS controller-to-ECU interface is configured to deactivate inactive components of the TRS.

7. The TRS controller-to-ECU interface of claim 1, further comprising an ignition connection between the TRS controller and the ECU, the ignition connection being configured to send an ignition message from the TRS controller to the ECU.

8. The TRS controller-to-ECU interface of claim 1, wherein the secondary connection is configured to prepare the electronically controlled engine for starting and stopping, and
wherein when the secondary connection is in an active logic state, the ECU is configured to prepare the electronically controlled engine for starting, and when the secondary connection transitions from an active logic state to an inactive logic state, the ECU is configured to instruct the electronically controlled engine to stop.

9. The TRS controller-to-ECU interface of claim 1, further comprising a starter connection between the TRS controller and the electronically controlled engine, the starter connection being configured to send a start message from the TRS controller to the electronically controlled engine for starting the electronically controlled engine.

10. The TRS controller-to-ECU interface of claim 1, further comprising a magnetic pickup engine speed sensor that is configured to provide real-time engine speed information of the electrically controlled engine to the TRS Controller directly from the electronically controlled engine.

11. The TRS controller-to-ECU interface of claim 1, further comprising a coolant temperature sensor that is configured to directly provide a coolant temperature of a coolant in the electronically controlled engine to the TRS controller.

12. The TRS controller-to-ECU interface of claim 1, wherein the ECU includes one or more engine information sensors configured to determine: a coolant level; a coolant temperature; an engine speed; an oil pressure; a fuel pressure; and an oil level,
wherein the ECU is configured to transmit engine information from the one or more sensors to the TRS controller via the CAN communication connection.

13. The TRS controller-to-ECU interface of claim 1, wherein when the connection is in an active logic state, the TRS controller-to-ECU interface is configured to provide the TRS controller engine information of the electronically controlled engine during and after a shutdown of the electronically controlled engine.

14. The TRS controller-to-ECU interface of claim 1, wherein the ECU is configured to regulate an amount of fuel delivered to the electronically controlled engine in order to maintain a speed of the electronically controlled engine regardless of a load on the engine, and
wherein the TRS controller is configured to regulate a refrigeration condition within a space of the transport unit.

15. The TRS controller-to-ECU interface of claim 1, wherein the secondary connection is a keyswitch connection.

16. The TRS controller-to-ECU interface of claim 1, wherein the secondary connection is a keyswitch/ignition connection.

17. The TRS controller-to-ECU interface of claim 1, wherein the secondary connection is a run/keyswitch/ignition connection.

\* \* \* \* \*